Feb. 6, 1951　　　　　W. POOL　　　　　2,540,286
CONTROL MEANS

Filed Jan. 2, 1947　　　　　　　　　　3 Sheets-Sheet 1

W. POOL
INVENTOR

ATTORNEYS

Feb. 6, 1951 W. POOL 2,540,286
CONTROL MEANS
Filed Jan. 2, 1947 3 Sheets-Sheet 3

W. POOL
INVENTOR

ATTORNEYS

Patented Feb. 6, 1951

2,540,286

UNITED STATES PATENT OFFICE 2,540,286

CONTROL MEANS

William Pool, Spondon, near Derby, England, assignor to Celanese Corporation of America, a corporation of Delaware Application January 2, 1947, Serial No. 719,887
In Great Britain January 4, 1946

1 Claim. (Cl. 219—20)

This invention relates to control means, and particularly to temperature control means, and is particularly concerned with a method and apparatus for controlling the temperature of a series or battery of independent units to which heat is applied. The invention is especially, though not exclusively concerned with the temperature control of a battery of melting vessels employed in the melt-spinning of fusible filament-forming materials for the production of artificial filaments and like products.

In the melt-spinning of such materials it is very desirable that the temperature within the melting vessel should be controlled within very close limits in order on the one hand that the maximum permissible temperature may be employed and the materials fused as rapidly as possible so as to be subjected to the melting temperature for a minimum of time, and on the other hand that the permissible temperature should not be exceeded so giving rise to excessive decomposition of the material during melting. For the purpose of supplying heat at a controlled rate to the melting vessel for this purpose, electrical heating coils are the most convenient means. The close control of the heavy power supply involved is expensive, however, necessitating costly and bulky instruments for the purpose of switching the power on and off in accordance with the rise and fall within a narrow range of temperature of the melting vessel. It has been found, however, that where, as is usual, a series of independent melting vessels are employed, an appropriate procedure enables them all to be controlled independently of one another by a common temperature control instrument, thereby reducing the cost of the apparatus involved and of its operation and maintenance, and the space occupied by the apparatus as a whole. Similar considerations apply to other cases in which a plurality of similar but independent units are to be maintained within close temperature limits.

According to the present invention apparatus for controlling the temperature of a plurality or battery of units comprises individual control means for the supply of heat to each unit, a common selector device adapted to receive a temperature indication and to act on control means, and means for connecting said selector means simultaneously to the temperature-sensitive means and to the control means of each unit successively in a regular cycle, said selector device being adapted to select whether the control means to which it is connected shall or shall not supply heat to the corresponding unit throughout the next ensuing cycle, according to whether the temperature indicated by the corresponding temperature-sensitive means is above or below a predetermined datum. By these means a temperature detection is effected on each unit in rotation at regular intervals and, for a period beginning at each detection and lasting until the next detection on the same unit, heat is supplied or not supplied to that unit according to whether the temperature is below or above the predetermined datum at the moment of detection, and irrespective of variations in the temperature of the unit occurring in the course of that period, which variations cannot take effect until the next moment of detection, at the end of the period. The selector device can be arranged to transfer its attention from unit to unit at short intervals, and return again to any particular unit at longer intervals equal to the sum of as many short intervals as there are of units to be controlled. Whenever the selector device is subjected to the action of the temperature of a particular unit (which may conveniently be effected by connecting it to an individual thermocouple contained in the unit) and is connected to the control means associated with that unit, it will either switch on or leave switched on the supply of heat if the temperature indicated is below the fixed datum, or will switch off or leave switched off the supply of heat if the temperature is above that datum.

In order to increase the sensitivity of the arrangement, heat may be constantly supplied to each of the units at a rate as near as possible to, but below the requirements of the unit, the heat supplied through the control means being additional heat supplied at relatively low rate. The heat constantly supplied should be supplied at as high a rate as possible consistent with the certainty that it will not exceed the requirements of the unit, which means in practice that the heat will fall short of these requirements. Similarly, the additional heat supplied should be supplied at as low a rate as is consistent with the certainty that, if it were supplied without interruption, the requirements of the unit would be exceeded.

Where an individual thermocouple in each unit, as mentioned above, or other individual electrically indicating temperature-sensitive means is employed this may conveniently be connected in turn to the selector device by means of a rotating switch driven by a timing motor rotating at a suitable speed, the same motor being employed for effecting the connection between the selector device and the control means for the supply of heat to the various units. The latter connection may be effected electrically by means of a second rotary switch or mechanically by means of a rotating part bringing an operating member into successive juxtaposition with a series of power switches constituting the control means for the several units.

An example of an arrangement in which the connection between the selector device and the power switches is effected electrically involves the use of a solenoid in association with each switch, the solenoids being supplied with current by being connected in turn to the selector device through the second rotary switch. The selector device is such as to supply sufficient current to operate the solenoid to which it is connected if the temperature of the unit is above or below (whichever is more convenient) the fixed datum e. g. by means of a suitable thermionic valve controlled by an impressed voltage derived from a thermocouple and adapted to supply a substantial current (e. g. by closing a switch in a low-voltage circuit) when the impressed voltage is above a certain value. The solenoid may operate the power switch either directly or through a suitable mechanical relay. For example each switch may be actuated by a longitudinally reciprocating member hooked at each end and capable of being tipped by the solenoid about its mid-point so as to engage the switch member with one or other of its hooked ends according to whether the switch is required to be on or off. This arrangement provides a suitable lost motion to allow for the possibility that the switch is already in the desired position, in which case the operative hook will merely reach the switch at the end of its throw, and not change the position of the switch.

An example of an arrangement in which the connection between the selector device and the power switches is effected mechanically comprises a rotating drum having on its surface a plurality of wedge-shaped projections, the angles of the wedges pointing in the direction of rotation of the drum. The switches are arranged about the drum, facing inwards and adapted to be engaged in rotation by one or other of the projections. The selection whether the switch about to be engaged by a projection is to be left on or off is made by shifting the drum into one axial position or another so that the projection engages the switch on one side or other and, by a cam action due to its wedge form, turns the switch into or leaves it in the desired position. The axial shifting of the drum may be effected (if necessary) immediately before the engagement of the switch by means of a single solenoid constantly connected to the selector device. The driving of the drum by the same motor and preferably on the same shaft as the rotating switch connecting the temperature-sensitive devices to the selector device ensures proper timing between the act of temperature detection and the act of adjusting the appropriate switch to the required position.

By way of example one form of apparatus according to the present invention will now be described in greater detail with reference to the accompanying drawings, in which Figure 1 is a side elevation of a melt-spinning apparatus to which a temperature controlling device in accordance with the invention is applied.

Figure 1:
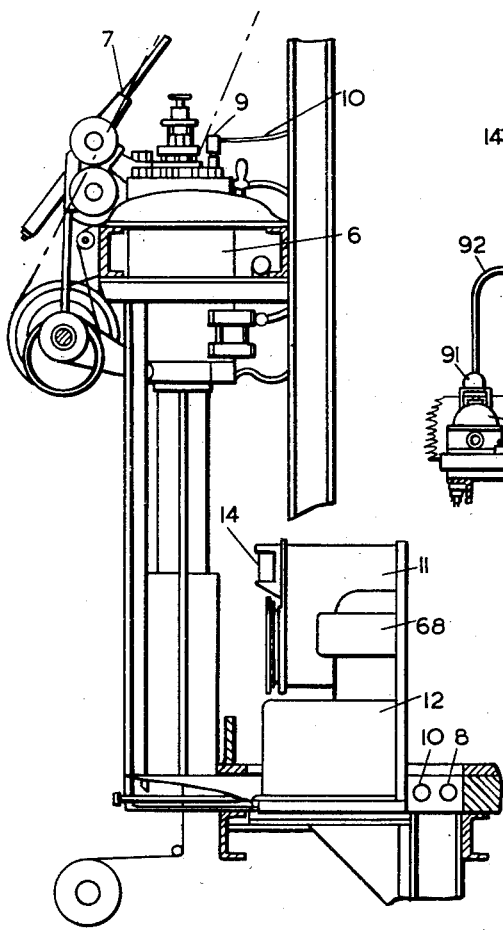

The controlling device described is one that is adapted for controlling the supply of heat to a battery of twelve melting vessels employed in the melt-spinning of a fusible filament forming composition for the production of artificial filaments and like products. Figure 1 is a side elevation of the row of melting vessels 6 which are of the kind described in U. S. application Ser. No. 672,221, filed May 25, 1946, and are supplied with solid composition from a hopper through a tube 7 as described in that specification. The melting vessels are heated by electrical windings supplied with current through heater cables 8, one leading to each vessel. The supply of current to each vessel is controlled in accordance with the indications of a thermocouple indicated at 9, the several thermocouples being connected by means of cables 10 to the control instrument generally indicated in Figure 1 at 11. The heater cables 8 also lead to the control mechanism 12, disposed beneath the instrument 11.

Figure 2:
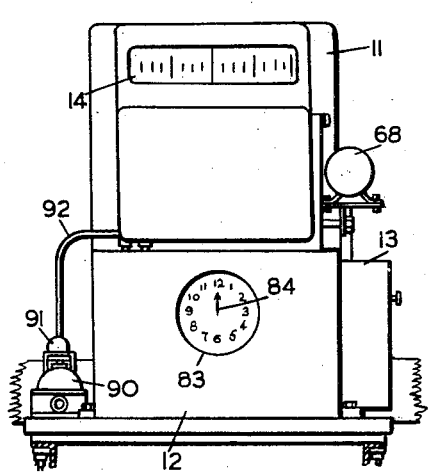
Figure 2 is a front elevation of the control instrument and the control mechanism employed in Figure 1.

The thermocouples of the several melting vessels 6 are arranged to be connected in turn to the control instrument 11 by means of a rotary switch indicated at 13 in Figure 2, to the right of the control mechanism 12. The instrument 11 is a standard instrument for amplifying the indication of temperature given by the thermocouples 9. The standard instrument is one which not only gives a reading on a dial 14 of the actual value of the temperature of a thermocouple to which it is connected but also, through suitable relays, closes or opens a switch controlling an external circuit accordingly as the temperature is below or above the adjustable datum. The time required for the operation of the instrument 11 may be adjusted to 15, 20, 30 or 60 seconds according to the accuracy of reading required and the variability of the temperature observed. For the purpose of the present case, this variability is low so that the minimum time can be employed. This gives total cycle of observation on all twelve vessels 6 of three minutes, fifteen seconds for each vessel.

Figure 3:
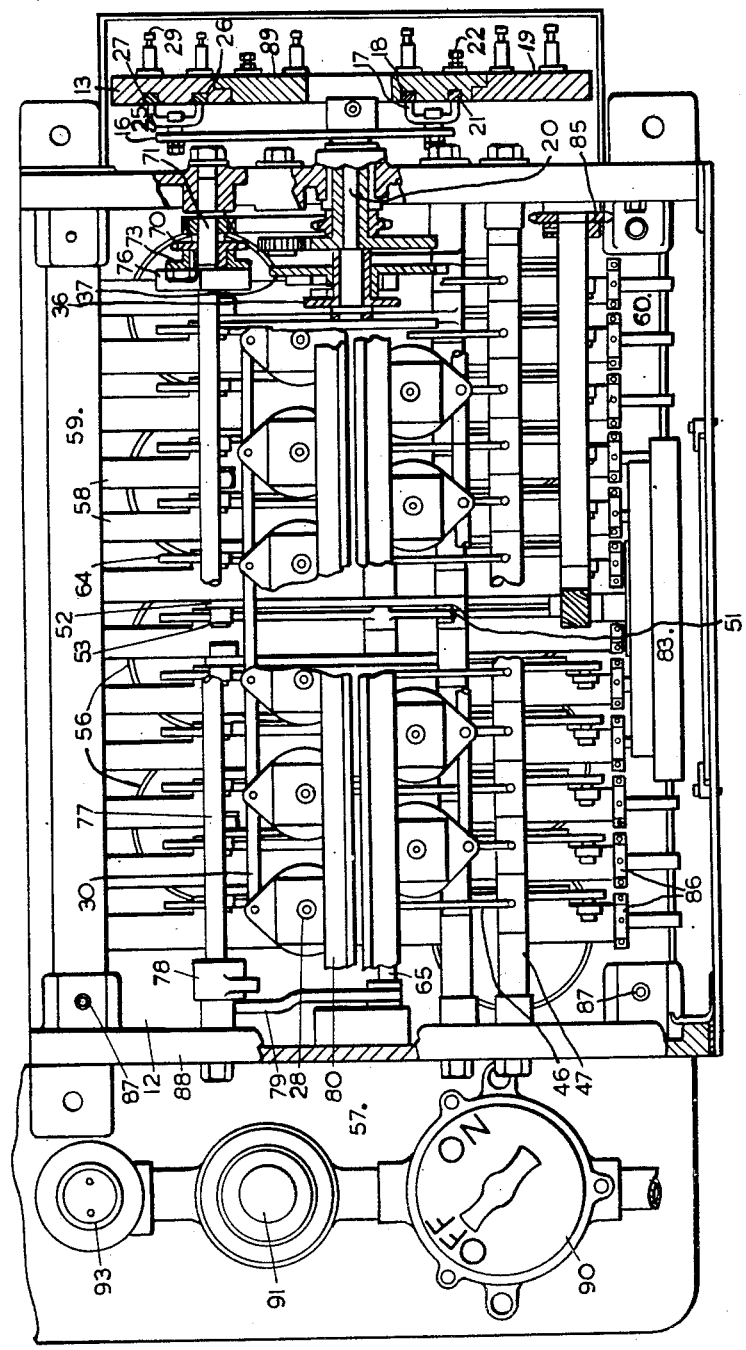
Figure 3 is a sectional plan of the control mechanism.
Figure 4:
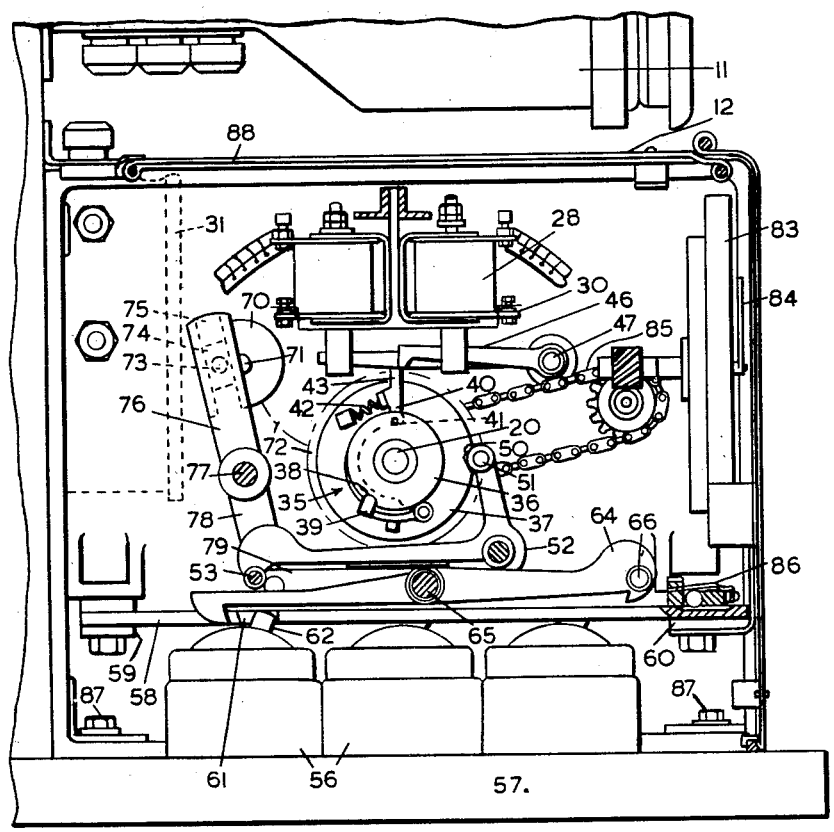
Figure 4 is a sectional side elevation of the control mechanism.
Figure 5:
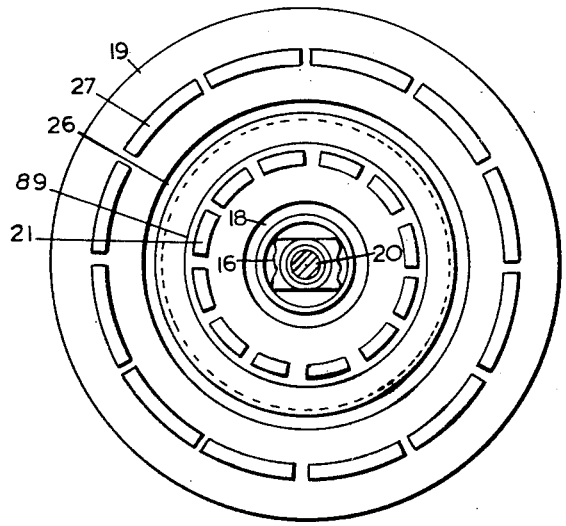
Figure 5 is a detail of the mechanism shown in Figures 3 and 4.

The rotary switch 13 is shown in greater detail in Figures 3 and 4. It comprises a rotating arm 16 carrying at one end a metal bridge 17 connecting a slip ring 18 mounted on a stationary disc 19 concentric with the shaft 20 by which the arm is carried, and a circular series of twelve contacts 21 on said disc 19. The twelve thermocouple leads 10 are connected to the terminals 22 of the contacts 21 while one side of the input of the instrument 11 is connected to the slip ring 18, the other side of the input and of each thermocouple being connected to a common earth. A second bridge piece 25 mounted on the other end of the arm 16 co-operates with a further slip ring 26 and a further series of contacts 27 to connect one side of the output of the instrument 11 (i. e. one side of the switch controlled by the instrument) through the slip ring 26 to a series of twelve solenoids 28 which are connected respectively to the terminals 29 of the contacts 27. The other ends of the solenoids 28 are connected to a bar 30 leading to one end of the low voltage winding of a transformer 31, the other end of the winding returning to the other side of the output of the selector instrument 11. The transformer thus constitutes a source of low voltage power to each of the solenoids in turn, provided that the switch controlled by the instrument 11 is closed. If the switch is open no power is supplied to the solenoids. Each of the solenoids 28 is connected to the output side of the instrument 11 at the end of the period (represented by the circumferential length of the contacts 21) during which the thermocouple of the corresponding vessel 6 is connected with the input side of the instrument. Thus by the time the solenoid is connected, the instrument 11 has had time to be operated in accordance with the indication given it by the corresponding thermocouple. Thus the solenoid will be energized when the thermocouple indicates a temperature below a fixed datum (the switch in the instrument 11 thereby being closed) and is not energized when the temperature indicated on the thermocouple is above that datum so that the switch is open.

As shown in Figures 3 and 4, there is associated with each of the twelve solenoids 28 a small clutch generally indicated at 35, the clutches being mounted on the shaft 20 carrying the rotary switch arm 16 described above. Each clutch 35 comprising a pair of discs, 36, 37. The disc 36 is a driving disc and is fixed to the shaft 20 while the disc 37 is a driven disc and is freely mounted on the shaft 20. The disc 36 has a semicircular notch 38 in its periphery which is adapted to be engaged by the shaped end of a lever 39 mounted on the disc 37 in a position substantially tangential to the disc 36. The outer surface of the lever 39 is shaped to form a ramp which is adapted to be engaged by the end of a second lever 40 also carried by the disc 37. The lever 40 is pivoted to the disc 37 at 41, being shaped to reach round the clutch shaft 20 and then bent through a right angle so as to engage the shaped outer surface of the lever 39. A spring 42 loads the lever 40 in such a way as to urge the shaped end of the lever 39 against the edge of the disc 36. The other end of the lever 40 projects beyond the edge of the disc 37 at 43, and the shaft 20 is rotated in such a direction (clockwise in Fig. 4) that if the projecting end 43 encounters an obstacle it is pivoted against the action of the spring 42 and ceases to urge the lever 39 into engagement with the notch 38, and so disengages the disc 37 from the disc 36. Such an obstacle is provided in the form of a horizontal lever 46 controlled by the solenoid 28 corresponding to the clutch, and lifted out of the path of the projecting end 43 when the solenoid 28 is energised. The impulse given to the solenoid by the engagement of the bridge 25 when the corresponding contact 27 is timed to arrive when the end 43 of the lever 40 reaches its uppermost position (assuming the clutch 35 to be in engagement) so that the lever 39 is able to drop by gravity out of engagement with the notch 38.

If the impulse fails to arrive the horizontal lever 46 is left in the way of the projecting end 43 and disengages the clutch 35, the shaped end of the lever 39 then riding on the edge of the disc 36 for a full revolution thereof. By the time the notch 38 again reaches the shaped end of the lever 39 a further impulse is due to arrive (or not arrive) at the solenoid 28 and the clutch is again engaged (or allowed to remain disengaged) for a further revolution and so on. The solenoids 28 are arranged for convenience in two staggered rows and the twelve corresponding levers 46, being pivoted about a common shaft 47, are of different lengths according to whether they are operated by a solenoid 28 in the row nearer to or further from the shaft 47.

A V notch 50 in the edge of the driven disc 37 is engaged by a follower roller 51 on the end of the vertical arm of a bell-crank lever 52, the other arm of the lever 52 passing horizontally under the clutch shaft and having a roller 53 on its extremity for a purpose described hereafter. The notch 50 is in engagement with the follower 51 when the clutch 35 is in the disengaged position. When the disc 37 is rotated the follower roller 51 rides on the edge of the disc 37 for a full revolution thereof, thereby raising for that period the follower roller 53. The cables 8 for the supply of heater current to the twelve melting vessels 6 are connected to twelve 15-ampere tumbler switches 56 mounted on the base board 57 of the control mechanism 12 in three rows of four, each row extending parallel to the shaft 20 beneath which the switches are disposed, and being slightly staggered with respect to the next row. Extending traversely across the rows of switches 56 are twelve strips 58 of resin-impregnated canvas, one for each switch, the strips 58 being supported on bars 59, 60 and being arranged to slide longitudinally. Each strip is notched as at 61, to receive the lever 62 of the corresponding tumbler switch 56 so as to operate the switch in its to-an-fro sliding motion. Above the twelve strips 58 are arranged twelve horizontal levers 64 mounted on a common pivot rod 65 extending parallel to and above the middle row of switches 56. Each lever 64 is hooked at both ends so that one end or the other engages the strip 58 lying beneath it, the strips 58 being suitably shaped for the effective engagement of the hooks. The common pivot rod 65 is reciprocated laterally to and fro twelve times in each revolution of the clutch shaft 15. One end of each lever 64 (the right hand end in Figure 4) is heavier than the other end and carries a roller 66 which can rest on the surface of the strip 58. The other end of the lever 64 is engaged from above by the follower roller 53 on the horizontal arm of the bell-crank lever 52 actuated by the corresponding clutch 35. Thus when the clutch 35 is engaged and the clutch disc 37 is in rotation the follower 53 is raised and the heavier end of the lever 64 is in engagement with the corresponding strip 58. When the clutch 35 is disengaged however the disc 37 is stationary and the follower 51 on the bell-crank lever 52 lies in the V notch thereof. Consequently the follower 53 is down, and the lighter end of the lever 64 is depressed into engagement with the strip 58.

The drive to the pivot rod 65 and the clutch shaft 20 is taken from a motor 68 disposed above the control mechanism 12 and alongside the instrument 11. The motor 68 is connected by a chain to a sprocket 70 mounted on a stub shaft 71 connected by means of gears 72 giving a reduction of 12 to 1 to the clutch shaft 20. The sprocket 70 carries a crank pin 73 fitting in a block 74 sliding in a channel 75 in an oscillating lever 76. The lever 76 is secured to an oscillating shaft 77 and depending from the two ends of the shaft 77, are two further levers 78 attached by connecting rods 79 to the pivot rod 65. The ends of the pivot rod 65 enter slotted guides 80 which constrain the rod 65 to oscillate in a horizontal plane under the influence of the crank 73. By these means the pivot rod 65 is oscillated laterally to and fro once in every 15 seconds and the clutch shaft 20 is driven round once in every three minutes.

By the means described above the thermocouples 9 of the twelve melting vessels 6 are connected in turn to the selector instrument 11 which, in combination with the rotary switch 12, sends or fails to send impulse to the solenoids 28 corresponding to the vessels 6, according to whether the thermocouple 9 in each vessel indicates a temperature below or above the desired temperature. If an impulse is received, the horizontal lever 46 controlling the clutch 35 is lifted and the clutch is allowed to engage, or to remain in engagement if it is already engaged. Rotating of the driven disc 37 of the clutch maintains the horizontal arm of the bell-crank lever 52 in a raised position. Consequently the heavier end of the hooked lever 64 is able to engage with the strip 58 lying beneath it and, as the pivot rod 65 is reciprocated laterally the strip 58 is moved in such a direction (to the left in Fig. 4) as to switch on the corresponding switch 56 and so deliver power to the melting vessel 6. If the switch is already on, the strip 58 remains in its original position.

If on the other hand no impulse is received by the solenoid 28, the clutch 35 remains disengaged or is disengaged as the projecting end 43 of the lever 40, encounters the horizontal lever 46 which has not been raised by the solenoid 28. Consequently, for the next revolution of the shaft 20 the follower roller 51 rests in the V notch 50 in the edge of the disc 37 and the follower roller 53 holds down the lighter end of the lever 64. As a result the strip 58 is moved to the right (in Fig. 4) and the switch 56 is switched off, or both strip and switch are left in the off position if they are already there.

An indicator dial 83 is provided, having twelve different positions indicated by a pointer 84 connected by a sprocket 85 to the shaft 20 and rotated at the same speed. The pointer 84 serves to indicate which melting vessel 6 is connected to the selector instrument 11 at any moment, which enables the vessel to be identified whose actual temperature is shown on the scale 14 of the instrument 11. Behind each of the numbers on the dial 83 is a small lamp, which is lit when power is being supplied to the corresponding melting vessel and not when no power is supplied. The lamps are supplied with current from the transformer 31 and are controlled by small switches 86 operated by the horizontal strips 58.

The solenoids 28, clutches 35 and other means for operating the power switches 56, including the transformer 31 the rotary switch arm 16 and the greater part of the rotary switch disc 19, are mounted in the casing 88 as a single unit which, by releasing the holding down bolts 87, can be removed as a whole from the base board 57 which carries the power switches 56 and all the electrical connections and fuses thereof together with a main switch 90 and indicator lamp 91. The central portion 89 of the rotary switch 13, carrying contacts 21 to which the thermocouples are connected, is detachable from the assembly so that it can be left with its connections intact when the assembly is removed. The only other connection that needs to be broken is the supply lead 92 of the transformer 31, which plugs into a socket 93 in the base board 57. This arrangement gives very good accessibility to all the mechanical and electrical parts involved.

The apparatus described above is suitable for the melt-spinning of fusible filament-forming materials, examples of which are the synthetic linear polyamides made, e. g. by the condensation of diamines with dicarboxylic acids, and polyvinyl compounds, e. g. polyvinylidene chloride and copolymers of vinyl chloride and vinyl acetate.

Having described my invention, what I desire to secure by Letters Patent is:

Switch-operating apparatus for use in a system for controlling the temperature of a plurality of electrically heated units, which system comprises a plurality of thermocouples and a plurality of power switches, one thermocouple and power switch being associated with each of said units, said switch-operating apparatus comprising a pair of rotary switches, means for driving said switches in step with one another, a selector device adapted to receive a temperature indication through one of said rotary switches from each of said thermocouples in turn, a plurality of solenoids, one solenoid being associated with each of said units, the solenoid for each unit being adapted to be connected through the other of said rotary switches to said selector device at the same time that the thermocouple associated with that unit is connected to the selector device, and to be energized or not in accordance with the temperature indication from the thermocouple, an oscillating member, and means for mechanically connecting the power switch of each of said units to said oscillating member selectively in one direction or the other of its travel according to whether the solenoid for that unit is or is not energized.

WILLIAM POOL.

REFERENCES CITED

The following references are of record in the file of this patent:

UNITED STATES PATENTS

| Number | Name | Date |
| --- | --- | --- |
| 1,296,250 | Wyss | Mar. 4, 1919 |
| 1,511,050 | Collins | Oct. 7, 1924 |
| 1,607,077 | Hands | Nov. 16, 1926 |
| 1,898,124 | Harrison | Feb. 21, 1933 |
| 1,925,463 | Schmidt | Sept. 5, 1933 |
| 2,253,176 | Graves | Aug. 19, 1941 |
| 2,303,340 | Dreyfus | Dec. 1, 1942 |

OTHER REFERENCES

Chem. and Mett. Eng., September 1940, pages 628–629.